(12) United States Patent
Ferenczi

(10) Patent No.: US 11,757,877 B1
(45) Date of Patent: *Sep. 12, 2023

(54) DECENTRALIZED APPLICATION AUTHENTICATION

(71) Applicant: American Express Travel Related Services Company, Inc., New York, NY (US)

(72) Inventor: Andras L. Ferenczi, Peoria, AZ (US)

(73) Assignee: AMERICAN EXPRESS TRAVEL RELATED SERVICES COMPANY, Inc., New York, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/461,230

(22) Filed: Aug. 30, 2021

Related U.S. Application Data

(63) Continuation of application No. 16/555,607, filed on Aug. 29, 2019, now Pat. No. 11,146,552.

(51) Int. Cl.
*H04L 9/40* (2022.01)
*G06F 9/451* (2018.01)

(52) U.S. Cl.
CPC ......... *H04L 63/0876* (2013.01); *G06F 9/451* (2018.02)

(58) Field of Classification Search
CPC .............................. H04L 63/0876; G06F 9/451
See application file for complete search history.

(56) References Cited

U.S. PATENT DOCUMENTS

| | | | |
|---|---|---|---|
| 8,001,605 B2 * | 8/2011 | Padmanabhan | H04L 63/12 709/224 |
| 8,949,954 B2 * | 2/2015 | Etchegoyen | G06Q 50/265 713/182 |
| 10,263,787 B1 * | 4/2019 | Gelman | G06F 21/335 |
| 10,735,398 B1 * | 8/2020 | Covati | H04L 63/0838 |
| 2010/0031022 A1 | 2/2010 | Kramer | |
| 2011/0093920 A1 * | 4/2011 | Etchegoyen | H04L 63/0876 726/3 |
| 2011/0131339 A1 | 6/2011 | Brown et al. | |
| 2011/0321146 A1 * | 12/2011 | Vernon | G06F 21/35 726/7 |
| 2012/0159177 A1 | 6/2012 | Bajaj et al. | |
| 2014/0208389 A1 * | 7/2014 | Kelley | H04L 63/08 726/4 |
| 2014/0208440 A1 * | 7/2014 | Kelley | H04W 12/06 707/769 |
| 2014/0310787 A1 * | 10/2014 | Morley | H04L 63/08 726/5 |
| 2014/0331282 A1 | 11/2014 | Tkachev | |

(Continued)

FOREIGN PATENT DOCUMENTS

KR 1020110122432 11/2011

*Primary Examiner* — Yonas A Bayou
(74) *Attorney, Agent, or Firm* — Thomas | Horstemeyer, LLP.

(57) ABSTRACT

Disclosed are various embodiments for authenticating users of applications using decentralized data models for storing a user's identity. A fingerprint for a computing device is received from an application executing on the computing device. An identity key associated with the fingerprint for the computing device is then obtained, the identity key being linked to a signed claim. The signed claim is retrieved and evaluated. The application executing on the computing device is then granted access to the computing resource in response to evaluating the signed claim.

20 Claims, 6 Drawing Sheets

(56) References Cited

U.S. PATENT DOCUMENTS

| | | | |
|---|---|---|---|
| 2015/0150110 A1* | 5/2015 | Canning | H04L 63/0807 726/9 |
| 2015/0347683 A1* | 12/2015 | Ansari | G16H 10/60 726/7 |
| 2019/0306159 A1* | 10/2019 | Agarwal | H04L 63/0838 |
| 2020/0374113 A1* | 11/2020 | Noam | G06F 21/64 |

* cited by examiner

DECENTRALIZED APPLICATION AUTHENTICATION

CROSS-REFERENCE TO RELATED APPLICATIONS

This application is a continuation of copending U.S. patent application Ser. No. 16/555,607, entitled "DECENTRALIZED APPLICATION AUTHENTICATION" and filed on Aug. 29, 2019, which is incorporated by reference as if set forth herein in its entirety.

BACKGROUND

Multi-user applications often implement one or more authentication mechanisms to verify the identity and authenticity of individual users of the application. These authentication mechanisms can be used to identify and prevent fraudulent transactions (e.g., authentication mechanisms implemented by financial websites). As another example, the authentication mechanisms can be used to verify the identity of a user in order to confirm that a user is authorized to perform a particular operation or initiate a particular transaction.

However, many authentication mechanisms are often device specific. For example, a device fingerprint may be recorded when a user visits a web site. Subsequent visits by the user can be authenticated in part based on whether the same device fingerprint is identified by the application. However, when a user switches devices, a different device fingerprint may be generated, limiting the utility of the device fingerprint. Likewise, the device fingerprint often has to be authenticated independently by each web site visited by the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for implementing a decentralized authentication system for authenticating users with applications. A device fingerprint associated with a user can be authenticated by a first application. A record of the authentication of the device fingerprint can be stored in a decentralized data store, such as a distributed ledger (DL), a distributed hash table (DHT), or other decentralized data storage mechanism. When a second application attempts to authenticate a user that is associated with the same device fingerprint, the second application can query the decentralized data store to retrieve the records associated with the user and the device fingerprint. The second application can then determine whether to authenticate the user based on how trustworthy the second application determines the record of the previous authentication by the first application to be. By using a decentralized data store, no single entity is able to control the authentication data that can be used to identify individual users. In the following discussion, a general description of the system and its components is provided, followed by a discussion of the operation of the same.

Figure 1:
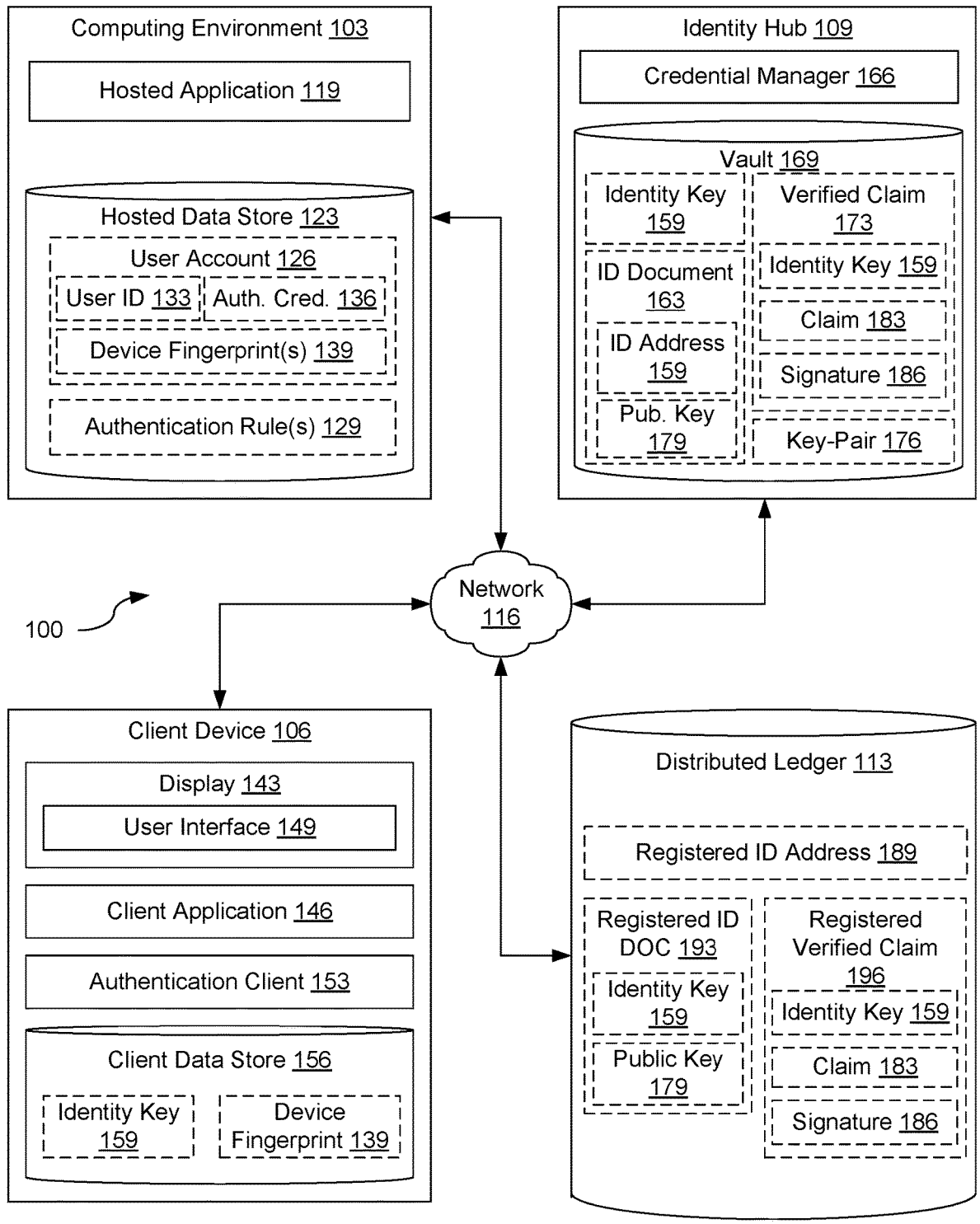
FIG. 1 is a drawing of a networked environment according to various embodiments of the present disclosure.

As illustrated in FIG. 1, shown is a networked environment 100 according to various embodiments. The networked environment 100 includes a computing environment 103, a client device 106, an identity hub 109, and a distributed ledger 113, which are in data communication with each other via a network 116. The network 116 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103 include a hosted application 119, and other applications, services, processes, systems, engines, or functionality not discussed in detail herein.

The hosted application 119 can be executed to provide access to users to data stored in the hosted data store 123 or to perform one or more functions or initiate one or more transactions on behalf of a user. Examples of hosted applications 119 include electronic banking applications, electronic commerce or shopping applications, social media applications, internet or web-based electronic mail (webmail) applications. However, any application hosted by computing environment 103 which identifies or authenticates users may be considered a hosted application 119 for the purposes of the various embodiments of the present disclosure.

Also, various data can be stored in a hosted data store 123 that is accessible to the computing environment 103. The hosted data store 123 can be representative of a plurality of hosted data stores 123, which can include relational databases, object-oriented databases, hierarchical databases, hash tables or similar key-value data stores, as well as other data storage applications or data structures. The data stored in the hosted data store 123 is associated with the operation of the various applications or functional entities described below. This data can include one or more user accounts 126, one or more authentication rules 129, and potentially other data.

A user account 126 can represent data associated with an individual user of the hosted application 119. This data can include both data related to the identity of the user and data to be used for authenticating a user associated with the user account 126. For instance, the user account 126 can include a user identifier 133, one or more authentication credentials 136, and one or more device fingerprints 139.

The user identifier 133 represents a unique identifier that allows the user account 126 to be distinguished from other user accounts 126. One example of a user identifier 133 is a user name. However, other unique data points that are associated with a user for sufficiently long durations may also be used as a user identifier 133 (e.g., email addresses, mobile or cellular phone numbers, etc.).

The authentication credentials 136 can represent data that, when presented to the hosted application 119, can be used to verify the authenticity of the user. Accordingly, authentication credential 136 can represent a secret that is known only to the user and is verifiable by the hosted application 119 or an attribute unique to the user and verifiable by the hosted application 119. For example, the authentication credential 136 could include a password or code known only to the user and is stored in encrypted or obfuscated form in the hosted data store 123. As another example, the authentication credential 136 could also include biometric data (e.g., fingerprints, retinal images or scans, facial recognition data, etc.) However, users may have more than one set of authentication credentials 136 (e.g., in a multifactor authentication (MFA) system). Accordingly, an authentication credential 136 could also include a way to verify that a user has a specific authentication device in his or her possession. For example, the authentication credentials 136 could include the seed for a time-based one-time password (TOTP) or hash-based one-time password (HOTP) system, or the cryptographic token for verifying a challenge received from a hardware security device (e.g., a device implementing the universal second factor (U2F) protocol).

The device fingerprints 139 represent a unique identifier associated with a client device 106 used by a user to access or interact with the hosted application 119. As a user may interact with the hosted application 119 using multiple client devices 106 (e.g., a desktop computer and a mobile device such as a smartphone or tablet computer), multiple device fingerprints 139 can be associated with a single user account 126. For example, a device fingerprint 139 could include hardware identifiers such as media access control (MAC) addresses of a client device 106, hardware serial numbers for a client device 106, international mobile equipment identifier (IMEI) numbers associated with a client device 106, and similar hardware identifiers. As another example, a device fingerprint 139 could represent a software configuration unique to the client device 106, such as a tuple representing the name, version, and configuration options for an application installed on the client device 106. One example of such a device fingerprint 139 is a browser fingerprint representing the unique combination of a user-agent string, a list of enabled browser plugins, a list of HTTP_ACCEPT headers supported by the browser, the time zone in which the browser is located, the list of system fonts available to the browser, whether cookies are enabled for the browser and which cookies are stored on the browser, the current language enabled for the browser, the current screen resolution and color depth available to the browser, etc. To protect user privacy, these device fingerprints 139 may be stored or transmitted in encrypted or obfuscated form (e.g., as a hash of the device fingerprint 139).

An authentication rule 129 can represent a logical rule for determining how to authenticate a user associated with a user account 126 and the criteria used for determining that the user associated with the user account 126 is authentic. For example, an authentication rule 129 can specify the particular types of authentication credentials 136 that must be provided by a user or which assertions provided by third-parties regarding a user account 126 or a device fingerprint 139 can be trusted.

The client device 106 is representative of a plurality of client devices that can be coupled to the network 116. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 143, such as liquid crystal displays (LCDs), gas plasma-based flat panel displays, organic light emitting diode (OLED) displays, electrophoretic ink ("E-ink") displays, projectors, or other types of display devices. In some instances, the display 143 can be a component of the client device 106 or can be connected to the client device 106 through a wired or wireless connection.

The client device 106 can be configured to execute various applications such as a client application 146 or other applications. The client application 146 can be executed by the client device 106 to access network content served up by the computing environment 103 or other servers, thereby rendering a user interface 149 on the display 143. To this end, the client application 146 can include a browser or a dedicated application (e.g., email applications, social networking applications, messaging applications, banking applications, shopping applications, etc.), and the user interface 149 can include a network page, an application screen, other user mechanism for obtaining user input.

The client device 106 can execute an authentication client 153, which can be used for authenticating a user of the client device 106 with the hosted application 119 executing in the computing environment 103. The authentication client 153 can be implemented as a standalone application that authenticates a user on behalf of the client application 146 (e.g., as a library installed on the client device 106) or as a component of the client application 146. For example, the authentication client 153 can include a script embedded in or referenced by a web page and downloaded by a browser.

A client data store 156 can also be present on the client device 106. The client data store 156 can include relational databases, object-oriented databases, hierarchical databases, hash tables or similar key-value data stores, as well as other data storage applications or data structures, which allow the client device 106 to locally store or cache data used by the client application 146 or the authentication client 153. The data stored in the client data store 156 can include one or more device fingerprints 139 and one or more identity keys 159.

The identity key 159 can represent a unique address that specifies the location where an identity document 163 can be found, such as a network address that specifies a network location of the identity document 163. The identity key 159 can include the storage location where the identity document 163 can be found, a unique identifier of the identity document 163, and potentially other information. As the identity key 159 can uniquely identity the identity document 163 with respect to other identity documents 163, the identity key 159 can also be used as a unique identifier for an individual. An illustrative example of an identity key 159 is a decentralized identifier (DID) as defined by the World Wide Web Consortium (W3C). However, data formats can be used as an identity key 159 in various embodiments of the present disclosure.

In the example of a DID, the identity key 159 can include a unique uniform resource identifier (URI) or unique uniform resource locator (URL) that specifies the type of identity key 159, the specific distributed ledger 113 in which an identity document 163 can be located, and a identifier of the identity document 163. For example, if an identity document 163 were stored using an implementation of the ETHEREUM protocol, an identity key 159 formatted as a DID has an example schema of "did:ethereum: 123456abcdefg." However, if the identity document 163 were not stored in a publicly available distributed ledger 113, but were instead stored in a privately accessible identity hub 109, then the identity key 159 might instead specify the address of the identity hub 109 and the unique identifier of the identity document 163.

The identity hub 109 can represent a service or collection of services hosted by one or more computing devices and utilized to securely store identity documentation for individual users and provide the identity documentation in response to authorized requests. For example, the identity hub 109 can include a credential manager 166 and a vault 169.

The credential manager 166 can be used to perform various functions. For example, the credential manager 166 can be used to add, remove, or modify various data stored in the vault 169 and related to individual users. As another example, the credential manager 166 can be used to authenticate individual users and limit access to the vault 169 to authorized users.

The vault 169 represents a secure data store accessible to the credential manager 166. Data stored in the vault 169 can be stored in an encrypted form that is only accessible to individual users. An individual user can store various types of data in the vault 169, including one or more identity keys 159, one or more identity documents 163, one or more verified claims 173, one or more asymmetric key-pairs 176, and potentially other data.

An identity document 163 is a document that provides information for identifying and authenticating a user. An identity document 163 can include an identity key 159, which can be used to uniquely identify the identity document 163 and, therefore, the individual associated with the identity document 163. An identity document 163 can also include a public key 179 from the asymmetric key-pair 176 of the user, which can be used by third-parties to verify a user's identity when presented with data cryptographically signed by a respective private key from the asymmetric key-pair 176 of the user. The identity document 163 can also specify other information related to the identity of the user or instructions for how to authenticate the identity of the user. For example, the identity document 163 may specify which authentication mechanisms an individual can use to cryptographically prove that he or she is associated with the identity document 163 and/or the identity key 159. An illustrative example of an identity document 163 is a decentralized identifier document (DID Document) as defined by the W3C. However, data formats can be used as an identity document 163 in various embodiments of the present disclosure.

A verified claim 173 represents a verified assertion made by a third-party about an individual associated with the identity key 159 and/or the identity document 163. Accordingly, a verified claim 173 can include the identity key 159 of the user for whom the verified claim 173 is made, the claim 183 itself, and a cryptographic signature 186 provided by the third-party making the claim 183.

The claim 183 represents an assertion about an individual or the individual's identity. As a first example, the claim 183 could state that a specific device fingerprint 139 is linked to or associated with a particular user. More specifically, in some implementations, the claim 183 could state that a device fingerprint 139 is linked to or associated with a specific identity key 159 or identity document 153. As a second example, the claim 183 could state that a user associated with the identity key 159 is at least a certain age (e.g., a claim by state agency that an individual user is at least 18 years old or at least 21 years old). Such a claim 183 could be used by a user to authenticate his or her eligibility for age-restricted content or services without having to divulge his or identity. As third example, a claim 183 could state that the user is a member of a particular organization (e.g., that a user is an employee of a company or is a member of a particular organization). Such a claim 183 could be used by a user to authenticate his or her eligibility for discounts at a retailer based on his or her membership in the organization or his or her status as an employee of a company, without having to divulge his or her identity. However, more detailed information about a user could also be provided in a claim 183, such as the legal name of the user, date of birth, residential address of the user, or other personally identifying information.

The cryptographic signature 186 can be used to verify the veracity and authenticity of the claim 183. For example, the cryptographic signature 186 can identify the third-party making the assertion and also include both a digital signature generated by a private encryption key in possession of the third-party entity and a digital fingerprint identifying the corresponding public encryption key that can be used to verify the cryptographic signature 186. The cryptographic signature 186 can also be used to determine whether the claim 183 has been modified without the consent of the entity making the claim 183. For example, an unauthorized change to the claim 183 would result in a mismatch between the signature 186 and the claim 183.

An asymmetric key-pair 176 can include any public/private key-pair generated by or on behalf of the user. The asymmetric key-pair 176 can be used by the user to generate new identity documents 163, verify the authenticity of the identity documents 163, or to authenticate the user with third-party applications, such as the hosted application 119.

The distributed ledger 113 represents a synchronized, eventually consistent, data store spread across multiple nodes in different geographic or network locations. Each node in the distributed ledger 113 can contain a replicated copy of the distributed ledger 113, including all data stored in the distributed ledger 113. Records of transactions involving the distributed ledger 113 can be shared or replicated using a peer-to-peer network connecting the individual nodes that form the distributed ledger 113. Once a transaction or record is recorded in the distributed ledger 113, it can be replicated across the peer-to-peer network until the record is eventually recorded with all nodes. Various consensus methods can be used to ensure that data is written reliably to the distributed ledger 113. Examples of a distributed ledger can include blockchains, distributed hash tables (DHTs), and similar data structures.

Various data can be stored in a distributed ledger 113. This can include one or more registered identity keys 189, one or more registered identity documents 193, one or more registered verified claims 196, and potentially other data. The registered identity key 189 can be the same as an identity key 159, albeit registered with and stored in the distributed ledger 113 instead of being stored in a private location such as the vault 169. Likewise, the registered identity document 193 can be the same as an identity document 163, albeit registered with and stored in the distributed ledger 113 instead of being stored in a private location such as the vault 169. Similarly, the registered verified claim 196 can be the same as a verified claim 173, albeit registered with and stored in the distributed ledger 113 instead of being stored in a private location such as the vault 169.

Identity keys 159 and identity documents 163 may be stored in the distributed ledger 113 as registered identity keys 189 and registered identity documents 193 in order to provide a publicly accessible and immutable record or copy of the respective identity key 159 or identity document 163. However, a user may not want to have a particular identity key 159 or identity document 163 publicly available (e.g., to obscure or conceal portions of their identity for privacy reasons). In these instances, an identity key 159 or identity document 163 may be stored in the vault 169 of an identity hub 109 instead of as registered identity keys 189 or registered identity documents 193 stored in the distributed ledger 113.

Next, a general description of the operation of the various components of the networked environment 100 is provided. A more detailed description of the operation of individual components is provided in the discussion of FIGS. 2-6. Moreover, while the following description provides one example of the interactions between the various components depicted in the network environment 100 of FIG. 1, they can be configured to operate in other manners, as discussed later.

To begin, a user of the client device 106 can attempt to access the hosted application 119 using the client application 146. In response to the access attempt, the hosted application 119 can response with a request for the client application 146 to authenticate the user. In some implementations, the hosted application 119 can also provide a copy of the authentication client 153 to the client application 146 for use in authenticating with the hosted application 119. For example, if the client application 146 is a browser, then the hosted application 119 could provide a JavaScript library to the browser for execution. In other implementations, however, the authentication client 153 can already be present or installed on the client device 106. In either implementation, the client application 146 can then cause the authentication client 153 to authenticate the user with the hosted application 119.

To authenticate the user with the hosted application 119, the authentication client 153 can first supply a user identifier 133 and a device fingerprint 139 to the hosted application 119. The hosted application 119 can then confirm whether it recognizes the device fingerprint 139. For example, the hosted application 119 may determine whether it has previously verified the device fingerprint 139 by querying the user account 126 identified by the user identifier 133 to evaluate whether the device fingerprint 139 supplied by the authentication application 153 has been stored in association with the user account 126. If the device fingerprint 139 is recognized, and the authentication client 153 or client application 146 has provided sufficient additional authentication credentials 136 (e.g., a password or passcode), then the hosted application 119 can authenticate the user and allow the client application 146 to access the functionality provided by the hosted application 119.

However, if the device fingerprint 139 is unrecognized, then the hosted application 119 can send a request for additional information to authenticate the client application 146 and/or the client device 106. In response, the client device 106 can supply one or more identity keys 159, one or more verified claims 173, and a device fingerprint 139 to the hosted application 119. This data can then be used by the hosted application 119 to verify the identity of the user of the client application 146 and/or client device 106.

For example, the authentication client 153 could search the client data store 156 for locally cached copies of identity keys 159 and provide them to the hosted application 119. As another example, the authentication client 153 could retrieve the identity keys 159 from the vault 169 of an identity hub 109 or from the distributed ledger 113 (if the identity keys 159 were previously stored in the distributed ledger 113 as registered identity keys 189) and provide them to the hosted application 119. This could occur, for example, if there are no identity keys 159 stored in the client data store 156.

The authentication client 153 could also retrieve one or more verified claims 173 from the vault 169 of the identity hub 109 and provide those verified claims 173 to the hosted application 119. The verified claims 173 could then be evaluated and authenticated by the hosted application 119 to confirm the identity of the user of the client application 146 and/or client device 106.

As a first example, the authentication client 153 could provide an identity key 159 and a verified claim 173 previously issued by the hosted application 119. The claim 183 could state that the identity key 159 is owned, controlled, or otherwise associated with the same user identified by the user identifier 133 in the user account 126. The claim 183 could also have a signature 186 that was previously created by the hosted application 119 or the entity in control of the hosted application 119. The hosted application 119 could verify the signature 186 to confirm the claim that the identity key 159 can be used to identify the user associated with the user identifier 133. In response to this verification, the hosted application 119 could then search for and retrieve the registered identity document 193 from the distributed ledger 113 that is associated with the identity key 159 in the verified claim 173. The hosted application 119 could then use the public key 179 to create a cryptographic challenge that is issued to the authentication client 153.

In response to receipt of the cryptographic challenge, the authentication client 153 could generate a cryptographic response to prove that it has access to the corresponding private key for the public key 179. For instance, the authentication client 153 could retrieve the private key from the key-pair 176 stored in the vault 169 and use the private key to create the cryptographic response. Once the hosted application 119 receives and verifies the cryptographic response using the public key 179, the hosted application 119 could determine that authentication client 153 is authenticating on behalf of the user. Access to the hosted application 119 could then be granted, and the device fingerprint 139 could be saved or stored in the user account 126 for use in authentication future access attempts.

As a second example, the authentication client 153 could provide an identity key 159 and a verified claim 173 previously issued by a third-party. The claim 183 could state that the identity key 159 is owned, controlled, or otherwise associated with the same user identified by the user identifier 133 in the user account 126. The claim 183 could also have a signature 186 that was previously created by the third-party. The hosted application 119 could verify the signature 186 to confirm that the third-party made the claim 183.

In response to this verification, the hosted application 119 could then evaluate one or more authentication rules 129 to determine whether the claim 183 is sufficient to authenticate the user of the client application 146 and/or client device 106. For example, some third-parties might be more trusted than others. Accordingly, an authentication rule 129 could specify that claims 183 made by certain, vetted third-parties are sufficient on their own to authenticate the identity of the user. Meanwhile, other authentication rules 129 might specify that claims 183 made by less-trusted third-parties can only be used for authentication if multiple, independent claims 183 made by independent third-parties are provided (e.g., two, three, five, etc. less-trusted third-parties must make the same claim 183 regarding the relationship between the identity key 159 and the user or user identifier 133). In some instances, an authentication rule 129 could even specify that a claim 183 cannot be used for authentication because the third-party making the claim is untrusted (e.g., because the third-party has a reputation for making incorrect or inaccurate claims 183).

If the hosted application 119 verifies the signature 186 for the claim 183 and determines that the authentication rules 129 indicate that the claim 183 is trustworthy, then the hosted application 119 can rely on the claim 183 in order to authenticate the user. Accordingly, the hosted application 119 can search for and retrieve the registered identity document 193 from the distributed ledger 113 that is associated with the identity key 159 in the verified claim 173. The hosted application 119 could then use the public key 179 to create a cryptographic challenge that is issued to the authentication client 153.

In response to receipt of the cryptographic challenge, the authentication client 153 could generate a cryptographic response to prove that it controls the corresponding private key for the public key 179. For instance, the authentication client 153 could retrieve the private key from the key-pair 176 stored in the vault 169 and use the private key to create the cryptographic response. Once the hosted application 119 receives and verifies the cryptographic response using the public key 179, the hosted application 119 could determine that authentication client 153 is authenticating on behalf of the user. Access to the hosted application 119 could then be granted, and the device fingerprint 139 could be saved or stored in the user account 126 for use in authentication during future access attempts.

Continuing with this second example, once the hosted application 119 has verified the user, the hosted application 119 can make its own verified claim 173 specifying that the identity key 159 uniquely identifies the user associated with the user identifier 133. For example, the hosted application 119 could create the verified claim 173. The hosted application 119 could then insert the identity key 159 for the verified claim 173 and the claim 183 that the user identifier 133 is associated with or identified by the identity key 159. The hosted application 119 could finally create a signature 186 for the claim 183 using a cryptographic key controlled by the hosted application 119 and add the signature 186 to the verified claim 173. The verified claim 173 could then be provided to the authentication client 153 for future use.

Figure 2:
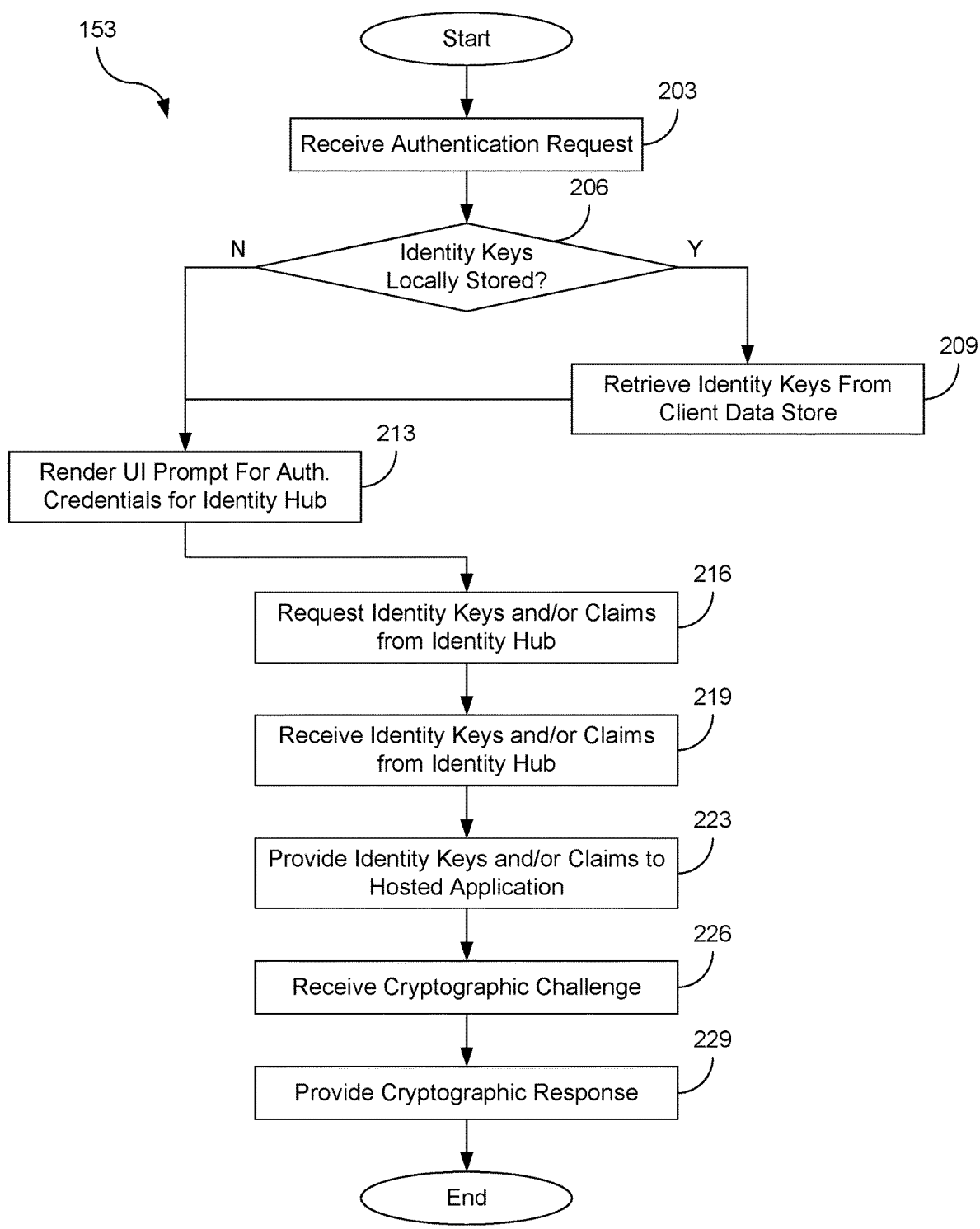
FIG. 2 is a flowchart illustrating one example of functionality implemented as portions of an application executed in a computing environment in the networked environment of FIG. 1 according to various embodiments of the present disclosure.

Referring next to FIG. 2, shown is a flowchart that provides one example of the operation of a portion of the authentication client 153. It is understood that the flowchart of FIG. 2 provides merely an example of the many different types of functional arrangements that can be employed to implement the operation of the depicted portion of the authentication client 153. As an alternative, the flowchart of FIG. 2 can be viewed as depicting an example of elements of a method implemented in the network environment 100.

Beginning with step 203, the authentication client 153 can receive an authentication request from another application, such as the hosted application 119. The authentication request may be received from the hosted application 119 as part of the authentication process between the client application 146 or authentication client 153 and the hosted application 119. For instance, the authentication request can indicate that one or more device fingerprints 139 previously provided by the client application 146 or authentication client 153 were not recognized by the hosted application 119. This could occur, for example, when a user attempts to access the hosted application 119 using a new client device 106 or a new version of the client application 146.

Next at step 206, the authentication client 153 can determine whether any identity keys 153 associated with the user identifier 133 or the device fingerprint 139 are stored locally on the client device. For example, the authentication client 153 can check the client data store 156 for the presence of appropriate identity keys 159 associated with the device fingerprint 139 of the client device 106. In some instances, if the authentication client 153 determines that an identity key 159 associated with the device fingerprint 139 is present in the client data store 156, the authentication client 153 can further confirm whether the identity key 159 is current. For example, the authentication client 153 could also determine whether the identity key 159 is current by determining whether the entry for the identity key 159 in the client data store 156 is older than a predefined limit (e.g., one week, one month, three months, etc.). If one or more identity keys 159 associated with the device fingerprint 139 are stored in the client data store 156, the authentication client 153 proceeds to step 209. Otherwise, the authentication client 153 skips to step 213.

Moving on to step 209, the authentication client 153 can retrieve the identity keys 159 from the client data store 156. In some implementations, the authentication client 153 may also be tasked with providing one or more verified claims 173 to the hosted application 119. In these implementations, the process would continue to step 213. In those alternative implementations where the hosted application 119 is configured to retrieve verified claims 173 independently of the client device 106 (e.g., by retrieving registered verified claims 196 from the distributed ledger 113), then the process could skip to step 223.

Proceeding to step 213, the authentication client 153 can cause a prompt to be rendered within the user interface 149 of the client application 146 on the display 143 of the client device 106. The prompt may ask for the user to select an identity hub 109 or a vault 169 within an identity hub 109 and provide authentication credentials to access the vault 169 within the identity hub 109. After the user provides the requested information in the prompt, the process continues to step 216.

Then at step 216, the authentication client 153 can access the vault 169 hosted by the identity hub 109 to retrieve one or more identity keys 159 and/or one or more verified claims 173. For example, the authentication client 153 can provide the credentials to the credential manager 166. Once the credential manager 166 authenticates the authentication client 153, the authentication client 153 can send a query to the credential manager 166 to retrieve one or more identity keys 159 and/or verified claims 173. For example, the authentication client 153 could send a query to the credential manager 166 specifying the device fingerprint 139 and/or the user identifier 133 in order to retrieve the desired identity keys 159 and/or verified claims 173. In some implementations, however, the authentication client 153 could query the vault 169 directly after authenticating with the credential manager 166.

Next, at step 219, the authentication client 153 can receive the requested identity keys 159 and verified claims 173 in response to the query provided at step 216.

Proceeding from either step 209 or step 219 to step 223, the authentication client 153 can send the identity keys 159 and/or verified claims 173 to the hosted application 119. This can be done in order to show the hosted application 119 that the device fingerprint 139 is a valid device fingerprint 139 for the user identifier 133.

Next at step 226, the authentication client 153 can receive a cryptographic challenge from the hosted application 119. The cryptographic challenge can contain a token that has been encrypted using the public key 179 specified in an identity document 163 associated with the identity key 159. By decrypting the token using a respective private key in the key-pair 176 that includes the public key 179, the authentication client 153 can prove, at the following step 229, the user is the owner of the identity key 159 that is the subject of the verified claim 173.

Then at step 229, the authentication client 153 can provide a response to the cryptographic challenge. The response can include, for example, a digital signature of the token generated by the private key for the public key 179 used to encrypt the token.

Figure 3:
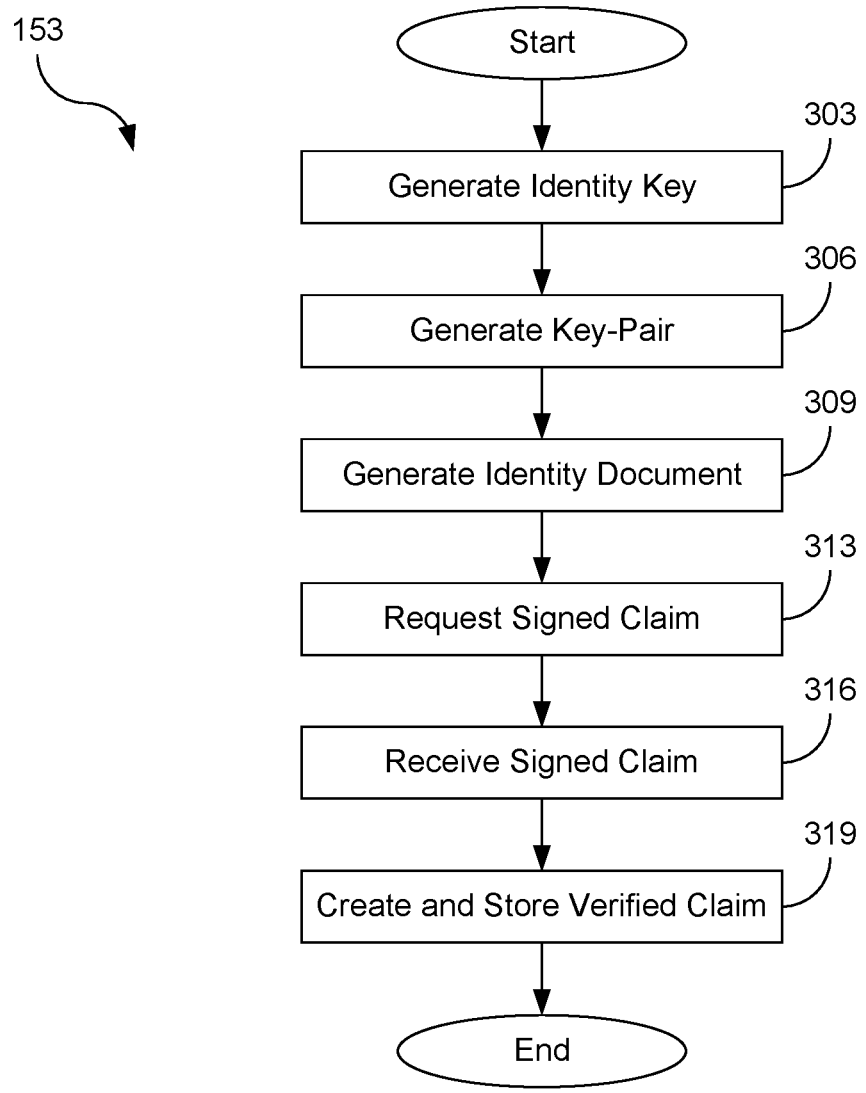
FIG. 3 is a flowchart illustrating one example of functionality implemented as portions of an application executed in a computing environment in the networked environment of FIG. 1 according to various embodiments of the present disclosure.

Referring next to FIG. 3, shown is a flowchart that provides another example of the operation of another portion of the authentication client 153. It is understood that the flowchart of FIG. 3 provides merely an example of the many different types of functional arrangements that can be employed to implement the operation of the portion of the authentication client 153. As an alternative, the flowchart of FIG. 3 can be viewed as depicting an example of elements of a method implemented in the network environment 100.

Beginning with step 303, the authentication client 153 can generate an identity key 159. In order to ensure that the identity key 159 is unique with respect to other identity keys 159, various approaches may be used. For example, a pseudorandom number generator may be used to generate at least a portion of the identity key 159. As another example, the most recently added registered identity key 189 could be queried and the network address of the newly created identity key 159 could be based at least in part on the network address specified by the registered identity key 189. For example, if the registered identity key 189 most recently added to the distributed ledger 113 contained the URN "did:example:123456," then the newly created identity key could be "did:example:123457." However, other approaches may also be used.

Then at step 306, the authentication client 153 can create a new asymmetric key-pair 176. The asymmetric key-pair 176 can be created using various approaches. For example, the asymmetric key-pair 176 could be created using elliptic curve cryptography or the Rivest-Shamir-Adleman (RSA) algorithm.

Next at step 309, the authentication client 153 can generate an identity document 163 associated with the identity key 159. The authentication client 153 can add both the identity key 159 previously created at step 303 and the public key of the key-pair 176 created at step 306.

Proceeding to step 313, the authentication client 153 can then send a request for a signed claim 183 to the hosted application 119. The request may be made, for example, after the authentication client 153 has already authenticated with the hosted application 119 (e.g., during the process previously described in FIG. 2 or similar processes). However, the request can also include authentication data, such as the user identifier 133, the authentication credentials 136, and/or the device fingerprint 139 associated with the user account 126. The request can also include the identity key 159 and/or the identifier document 163 previously created at steps 303 and 309.

Then at step 316, the authentication client 153 can received a signed copy of the claim 183 in response. For example, the authentication client 153 can receive both the claim 183 and a signature 186 created by the hosted application 119 for the claim 183.

Finally, at step 319, the authentication client 153 can create and save a verified claim 173. The verified claim 173 can include the identity key 159, the claim 183, and the signature 186. The verified claim 173 can, in some implementations be registered in the distributed ledger 113 as a registered verified claim 196 to allow the claim 183 to be publicly available. However, the verified claim 173 can also be stored privately, such as in the vault 169 of an identity hub 109, in order to hide or conceal from public view the relationship between the user and the hosted application 119.

Figure 4:
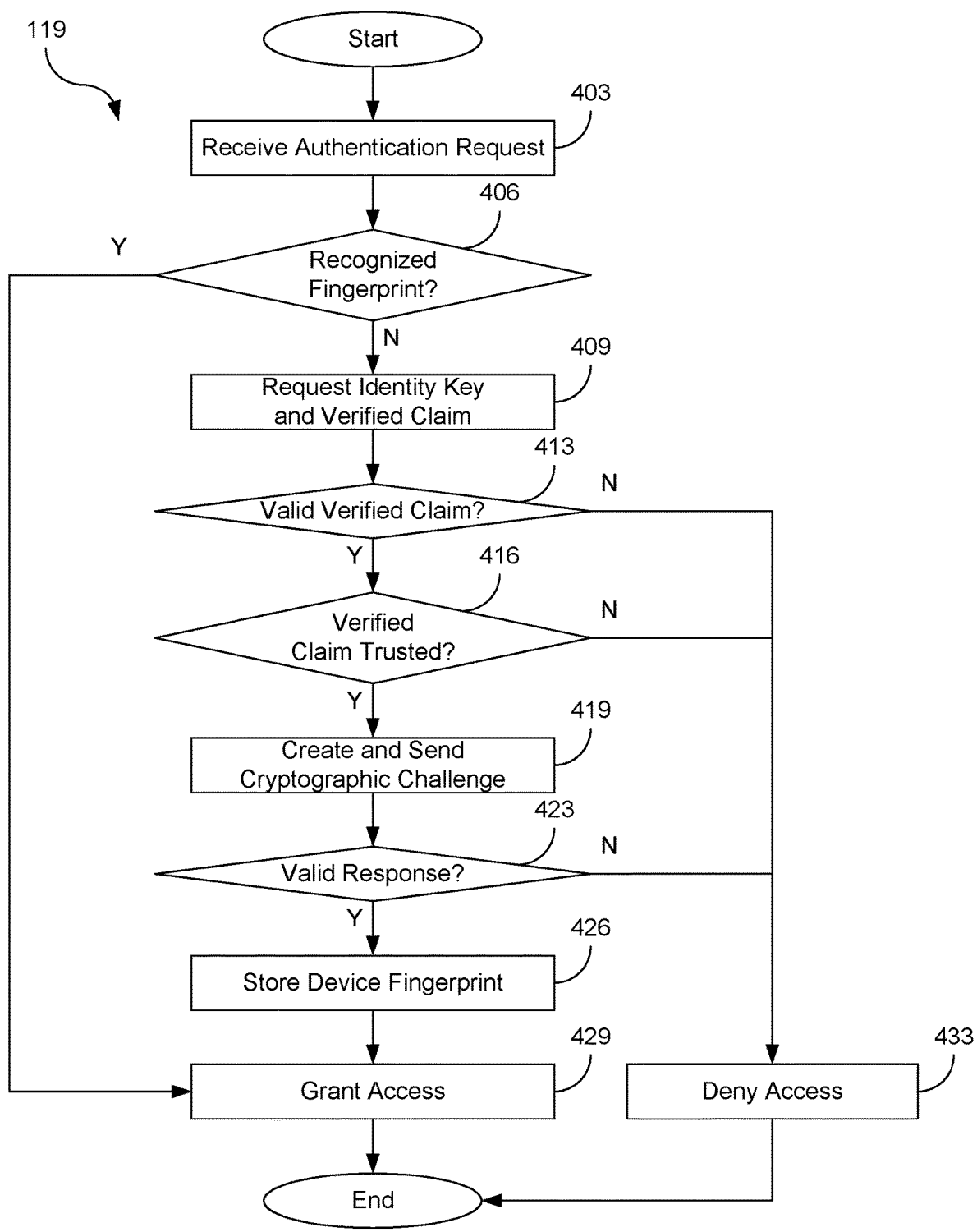
FIG. 4 is a flowchart illustrating one example of functionality implemented as portions of an application executed in a computing environment in the networked environment of FIG. 1 according to various embodiments of the present disclosure.

Referring next to FIG. 4, shown is a flowchart that provides one example of the operation of a portion of the hosted application 119. It is understood that the flowchart of FIG. 4 provides merely an example of the many different types of functional arrangements that can be employed to implement the operation of the depicted portion of the hosted application 119. As an alternative, the flowchart of FIG. 4 can be viewed as depicting an example of elements of a method implemented in the network environment 100.

Beginning with step 403, the hosted application 119 can receive an authentication request from the authentication client 153. The authentication request can be received, for example, as part of an attempt or request made by the client application 146 to access resources or capabilities made available by the hosted application 119. The authentication request can include the user identifier 133 associated with a user account 126, as well as one or more authentication credentials 136 associated with the user account 126, and a device fingerprint 139.

Then at step 406, the hosted application 119 can determine whether the device fingerprint 139 is recognized. For example, the user may have previously successfully authenticated with the hosted application 119 using the client device 106, in which case the device fingerprint 139 may be stored in the user account 126 stored in the hosted data store 123. If device fingerprint 139 is stored in the user account 126, then it can be recognized as being associated with a previous successful authentication attempt. If the device fingerprint 139 is recognized, then the process skips to step 429. However if the device fingerprint 139 is unrecognized, as may happen if a user is attempting to authenticate with the hosted application 119 for the first time with the client device 106, then the process proceeds to step 409.

Next at step 409, the hosted application 119 sends a request for an identity key 153 and a verified claim 173. For example, the hosted application 119 may request an identity key 153 and a verified claim 173 that shows that the user identifier 133 is associated with the unrecognized device fingerprint 139. The hosted application 119 can then receive the identity key 153 and verified claim 173.

Proceeding to step 413, the hosted application 119 can evaluate the verified claim 173. For example, the hosted application 119 may first determine that the identity key 153 matches the identity key 153 specified by the verified claim 173. Then the hosted application 119 can evaluate the claim 183 and the signature 186 of the claim 183 to determine the veracity of the claim 183. Finally, the hosted application 119 evaluates the claim 183 itself to determine whether the user identifier 133 is associated with the unrecognized device fingerprint 139. If all of these evaluations are true, namely that the verified claim 173 is linked to the user identifier 133, the signature 186 matches the claim 183, and the claim 183 states that the user identifier 133 is associated with the unrecognized device fingerprint 139, then the process proceeds to step 416. Otherwise, the process proceeds to step 433.

Then at step 416, the hosted application 119 can determine whether the verified claim 173 is trusted. For example, the hosted application 119 might determine the entity that asserted the claim 183 and make a determination regarding the trustworthiness of the claim 183 based on one or more authentication rules 129. For example, if the asserted claim 183 is made by a trusted or vetted entity, as recognized by the signature 186, then an authentication rule 129 could specify that the hosted application 119 is to trust the assertion made by the verified claim 173. As another example, if the asserted claim 183 is made by an entity that is not trusted (e.g., an unknown entity or an entity with a reputation for being inaccurate), then an authentication rule 129 could specify that the hosted application 119 is to not trust the assertion made by the verified claim 173. An authentication rule 129 could also specify that the verified claim 173 can be trusted, but only if a predefined number of other verified claims 173 make the same assertion (e.g., a verified claim 173 can be trusted if three (3) or more other verified claims 173 make the same assertion). Similarly, an authentication rule 129 could specify that a verified claim 173 is to be trusted, unless a predefined number of other verified claims 173 contradict the first verified claim 173. If the hosted application 119 determines that the verified claim 173 is to be trusted, then the process proceeds to step 419. However, if the hosted application 119 determines that verified claim 173 is not trusted, then the process proceeds to step 433.

Next at step 419, the hosted application 119 can create and send a cryptographic challenge to the authentication client 153. First, the hosted application 119 can obtain an appropriate identity document 163. Then, the hosted application 119 can use a public key 179 specified in the identity document 163 to create the cryptographic challenge.

The hosted application 119 could retrieve an identity document 163, such as a registered identity document 193 from the distributed ledger 113 or an identity document 163 stored in the vault 169, that is linked to the identity key 159. For example, the hosted application 119 could use the identity key 159 as a key to locate and retrieve a registered identity document 193 from the distributed ledger 113. As another example, the hosted application 119 could note that the identity key 159 specifies that the identity document 163 is stored in the vault 169. Accordingly, the hosted application 119 could provide the identity key 159 to the credential manager 166 of the identity hub 109 and receive a copy of the identity document 163 in response.

Once the hosted application 119 retrieves the identity document 163, the hosted application 119 can generate a token. The token can then be encrypted using the public key 179 to generate the cryptographic challenge. Therefore, only a user with access to the respective private key can decrypt the cryptographic challenge. If the user of the client device 106 is, indeed, the owner or controller of the identity key 159 and identity document 163, then the user will also have the respective private key. Once the cryptographic challenge is generated, it can be sent to the authentication client 153.

Moving on to step 423, the hosted application 119 can receive a response to the cryptographic challenge and determine whether or not it is a valid response. A valid response will contain at least the token, in unencrypted form, and signature for the token generated by the respective private key of the public key 179. The combination of the unencrypted token and the signature indicates that the authentication client 153 had access to the respective private key of the public key 179. Accordingly, the hosted application 119 could determine that the operator of the client device 106 is the authorized user identified by the user identifier 133 because the operator of the client device 106 can prove control of the private key for the respective public key 179 associated with the identity key 159 for which the claim 183 was made that the owner of the identity key 159 is also the user identified by the user identifier 133 who also uses a client device 106 with the unrecognized device fingerprint 139. If the response is valid, then the process proceeds to step 426. If the response is invalid, then the response proceeds instead to step 433.

Then at step 426, the hosted application 119 can store the unrecognized device fingerprint 139 in the user account 126. This can create a record of a relationship between the device fingerprint 139, the user identifier 1333, and the authentication credentials 136. As a result, the device fingerprint 139 can be used in the future to authenticate the user.

Next at step 429, the hosted application 119 can grant access to the client application 146 to access the resources provided by the hosted application 119. The process then ends.

However, if the process had instead proceeded to step 433, the hosted application 119 could deny access to the client application 146. In the event that access is denied, the previously described process ends. However, the client application 146 could always attempt to reconnect and reauthenticate with the hosted application 119 using the authentication client 153.

Figure 5:
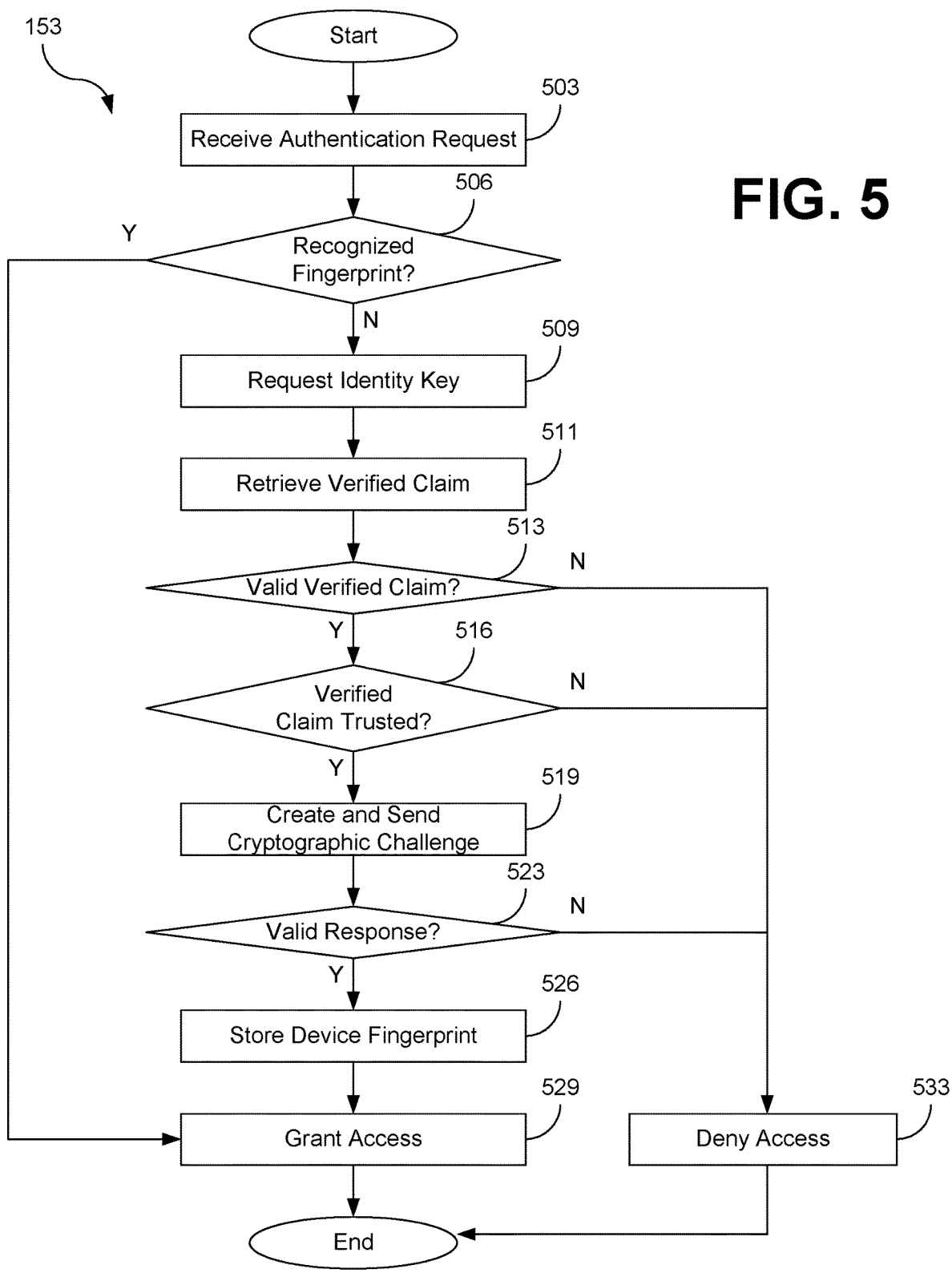
FIG. 5 is a flowchart illustrating one example of functionality implemented as portions of an application executed in a computing environment in the networked environment of FIG. 1 according to various embodiments of the present disclosure.

Referring next to FIG. 5, shown is a flowchart that provides one example of the operation of a portion of the hosted application 119. It is understood that the flowchart of FIG. 5 provides merely an example of the many different types of functional arrangements that can be employed to implement the operation of the depicted portion of the hosted application 119. As an alternative, the flowchart of FIG. 5 can be viewed as depicting an example of elements of a method implemented in the network environment 100.

Many of the steps illustrated in FIG. 5 are the same as or substantially similar to the steps depicted in FIG. 4. For example, the operations performed by the hosted application 119 at steps 503, 506, 513, 516, 519, 523, 526, 529, and 533 are the same as or substantially similar to respective steps 403, 406, 413, 416, 419, 423, 426, 429, and 433 as depicted in FIG. 4. However, step 509 differs from respective step 409 of FIG. 4 and the flowchart of FIG. 5 contains the additional step 511.

Beginning with step 503, the hosted application 119 can receive an authentication request from the authentication client 153. The authentication request can be received, for example, as part of an attempt or request made by the client application 146 to access resources or capabilities made available by the hosted application 119. The authentication request can include the user identifier 133 associated with a user account 126, as well as one or more authentication credentials 136 associated with the user account 126, and a device fingerprint 139.

Then at step 506, the hosted application 119 can determine whether the device fingerprint 139 is recognized. For example, the user may have previously successfully authenticated with the hosted application 119 using the client device 106, in which case the device fingerprint 139 may be stored in the user account 126 stored in the hosted data store 123. If device fingerprint 139 is stored in the user account 126, then it can be recognized as being associated with a previous successful authentication attempt. If the device fingerprint 139 is recognized, then the process skips to step 529. However if the device fingerprint 139 is unrecognized, as may happen if a user is attempting to authenticate with the hosted application 119 for the first time with the client device 106, then the process proceeds to step 509.

At step 509 the hosted application 119 can request the identity key 159. In some implementations, the hosted application 119 can send a request to the authentication client 153 for the identity key 159. However, in other implementations, the hosted application 119 could search a distributed ledger 113 for a respective registered identity key 189 associated with the device fingerprint 139 in order to obtain the identity key 159. In either implementation of this embodiment, no verified claims 173 are requested from the authentication client 153 at step 509.

Then, at step 511, the hosted application 119 can use the identity key 159 to retrieve one or more registered verified claims 196 from the distributed ledger 113. For example, the hosted application 119 could use the identity key 159 as a key for searching and retrieving one or more matching registered verified claims 196. By searching a distributed ledger 113 for the registered verified claims 196, the hosted application 119 can access claims 183 asserted by any third-party that has stored a registered verified claim 196 in the distributed ledger 113 instead of being limited to only those verified claims 173 provided by the authentication client 153, as described in the discussion of FIG. 4. For example, the authentication client 153 might only provide a selected group of verified claims 173 that would be likely to result in the hosted application 119 granting access to the client application 146. However, the distributed ledger 113 might contain registered verified claims 196 that would cause an authentication rule 129 to instruct the hosted application 119 to deny access.

Proceeding to step 513, the hosted application 119 can evaluate the verified claim 173. For example, the hosted application 119 may first determine that the identity key 153 matches the identity key 153 specified by the verified claim 173. Then the hosted application 119 can evaluate the claim 183 and the signature 186 of the claim 183 to determine the veracity of the claim 183. Finally, the hosted application 119 evaluates the claim 183 itself to determine whether the user identifier 133 is associated with the unrecognized device fingerprint 139. If all of these evaluations are true, namely that the verified claim 173 is linked to the user identifier 133, the signature 186 matches the claim 183, and the claim 183 states that the user identifier 133 is associated with the unrecognized device fingerprint 139, then the process proceeds to step 516. Otherwise, the process proceeds to step 533.

Then at step 516, the hosted application 119 can determine whether the verified claim 173 is trusted. For example, the hosted application 119 might determine the entity that asserted the claim 183 and make a determination regarding the trustworthiness of the claim 183 based on one or more authentication rules 129. For example, if the asserted claim 183 is made by a trusted or vetted entity, as recognized by the signature 186, then an authentication rule 129 could specify that the hosted application 119 is to trust the assertion made by the verified claim 173. As another example, if the asserted claim 183 is made by an entity that is not trusted (e.g., an unknown entity or an entity with a reputation for being inaccurate), then an authentication rule 129 could specify that the hosted application 119 is to not trust the assertion made by the verified claim 173. An authentication rule 129 could also specify that the verified claim 173 can be trusted, but only if a predefined number of other verified claims 173 make the same assertion (e.g., a verified claim 173 can be trusted if three (3) or more other verified claims 173 make the same assertion). Similarly, an authentication rule 129 could specify that a verified claim 173 is to be trusted, unless a predefined number of other verified claims 173 contradict the first verified claim 173. If the hosted application 119 determines that the verified claim 173 is to be trusted, then the process proceeds to step 519. However, if the hosted application 119 determines that verified claim 173 is not trusted, then the process proceeds to step 533.

Next at step 519, the hosted application 119 can create and send a cryptographic challenge to the authentication client 153. First, the hosted application 119 can obtain an appropriate identity document 163. Then, the hosted application 119 can use a public key 179 specified in the identity document 163 to create the cryptographic challenge.

The hosted application 119 could retrieve an identity document 163, such as a registered identity document 193 from the distributed ledger 113 or an identity document 163 stored in the vault 169, that is linked to the identity key 159. For example, the hosted application 119 could use the identity key 159 as a key to locate and retrieve a registered identity document 193 from the distributed ledger 113. As another example, the hosted application 119 could note that the identity key 159 specifies that the identity document 163 is stored in the vault 169. Accordingly, the hosted application 119 could provide the identity key 159 to the credential manager 166 of the identity hub 109 and receive a copy of the identity document 163 in response.

Once the hosted application 119 retrieves the identity document 163, the hosted application 119 can generate a token. The token can then be encrypted using the public key 179 to generate the cryptographic challenge. Therefore, only a user with access to the respective private key can decrypt the cryptographic challenge. If the user of the client device 106 is, indeed, the owner or controller of the identity key 159 and identity document 163, then the user will also have the respective private key. Once the cryptographic challenge is generated, it can be sent to the authentication client 153.

Moving on to step 523, the hosted application 119 can receive a response to the cryptographic challenge and determine whether or not it is a valid response. A valid response will contain at least the token, in unencrypted form, and a signature for the token generated by the respective private key of the public key 179. The combination of the unencrypted token and the signature indicates that the authentication client 153 had access to the respective private key of the public key 179. Accordingly, the hosted application 119 could determine that the operator of the client device 106 is the authorized user identified by the user identifier 133 because the operator of the client device 106 can prove control of the private key for the respective public key 179 associated with the identity key 159 for which the claim 183 was made that the owner of the identity key 159 is also the user identified by the user identifier 133 who also uses a client device 106 with the unrecognized device fingerprint 139. If the response is valid, then the process proceeds to step 526. If the response is invalid, then the response proceeds instead to step 533.

Then at step 526, the hosted application 119 can store the unrecognized device fingerprint 139 in the user account 126. This can create a record of a relationship between the device fingerprint 139, the user identifier 1333, and the authentication credentials 136. As a result, the device fingerprint 139 can be used in the future to authenticate the user.

Next at step 529, the hosted application 119 can grant access to the client application 146 to access the resources provided by the hosted application 119. The process then ends.

However, if the process had instead proceeded to step 533, the hosted application 119 could deny access to the client application 146. In the event that access is denied, the previously described process ends. However, the client application 146 could always attempt to reconnect and reauthenticate with the hosted application 119 using the authentication client 153.

Figure 6:
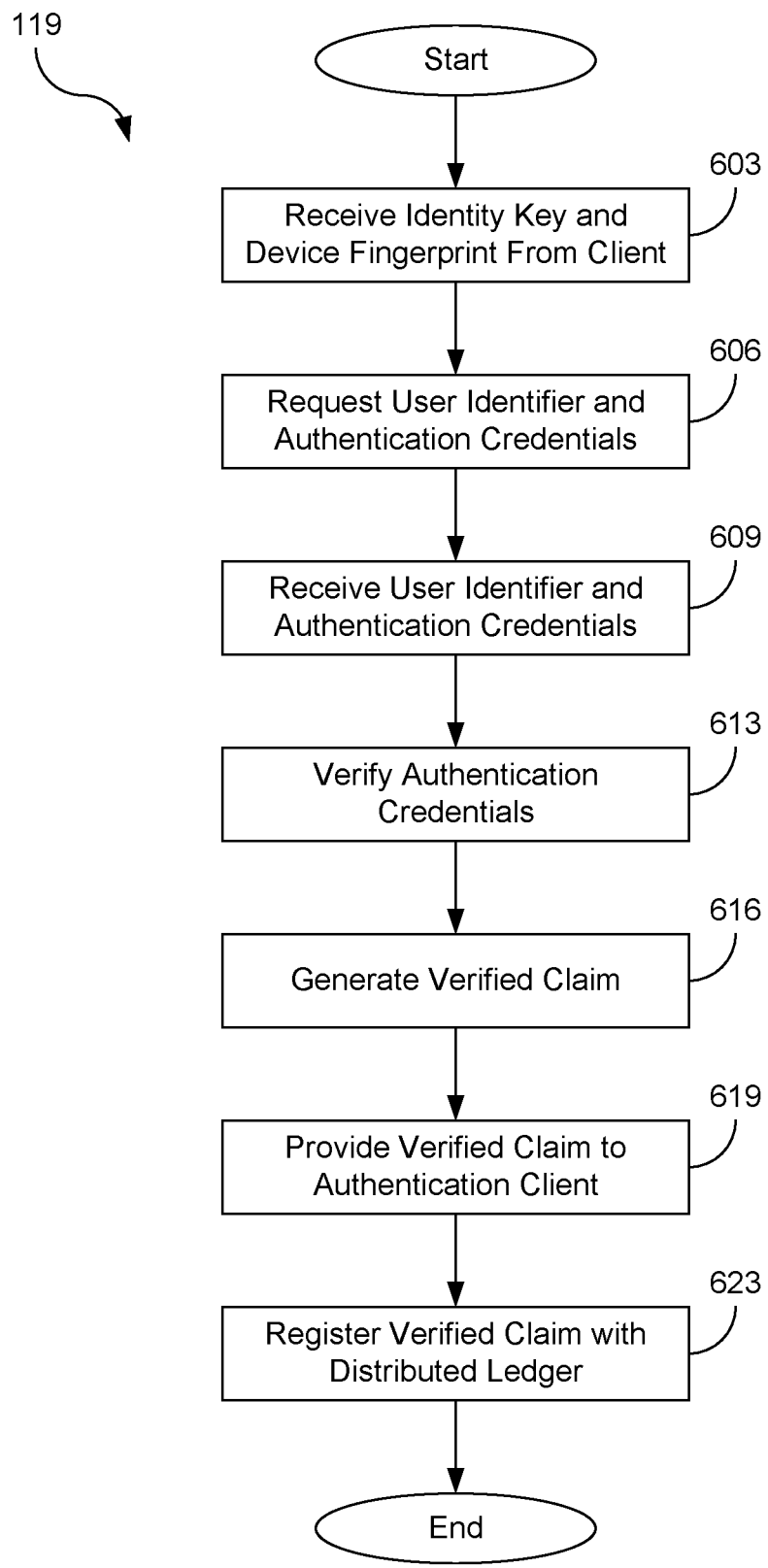
FIG. 6 is a flowchart illustrating one example of functionality implemented as portions of an application executed in a computing environment in the networked environment of FIG. 1 according to various embodiments of the present disclosure.

Referring next to FIG. 6, shown is a flowchart that provides one example of the operation of a portion of the hosted application 119. It is understood that the flowchart of FIG. 6 provides merely an example of the many different types of functional arrangements that can be employed to implement the operation of the depicted portion of the hosted application 119. As an alternative, the flowchart of FIG. 6 can be viewed as depicting an example of elements of a method implemented in the network environment 100.

Beginning with step 603, the hosted application 119 can receive from the authentication client 153 an identity key 159 to be associated with the device fingerprint 139 and the device fingerprint 139 itself. The identity key 159 and device fingerprint 139 could be provided by the authentication client 153 as part of a request for a verified claim 173 that asserts that the owner or controlling entity of the identity key 159 can be identified or is otherwise associated with the device fingerprint 139.

Then at step 606, the hosted application 119 can request the user identifier 133 and authentication credentials 136 for a user account 126 that is already associated with the device fingerprint 139. For example, the user account 126 may have already been verified as being associated with the device fingerprint 139 based at least in part on a verified claim 173 or registered verified claim 196 issued by a third-party. The user identifier 133 and authentication credentials 136 can be requested in order to verify that the client device 106 making the request for the verified claim 173 is controlled by an authorized user as represented by the user account 126.

Next at step 609, the hosted application 119 can then receive the user identifier 133 and authentication credentials 136 in response to the request made at step 606.

Moving on to step 613, the hosted application 119 can verify the authentication credentials 136. For example, the hosted application 119 could query the user account 126 to see if the received authentication credentials 136 match the authentication credentials 136 stored in the user account 126 identified by the user identifier 133 and the device fingerprint 139. If the received authentication credentials 136 match those on file, then the authentication credentials 136 could be determined to be valid and the request for the verified claim 173 could be considered to be a request made by an authorized user.

Proceeding next to step 616, the hosted application 119 can generate the verified claim 173. For example, the hosted application 119 could create a claim 183 that asserts that the device fingerprint 139 is associated with or otherwise identifies the user that owns or controls the identity key 159 received at step 603. The hosted application 119 could then create a signature 186 based at least in part on the claim 183. The signature, 186, the claim 183, and the identity key 159 can then be stored in the verified claim 173.

Then at step 619, the hosted application 119 can provide the verified claim 173 to the authentication client 153 in response. In some implementations, however, the hosted application 119 can also store the verified claim 173 in the distributed ledger 113 specified by the identity key 159 to create a registered verified claim 196. Making the verified claim 173 publicly available as a registered verified claim 196 may be done, for example, to allow other parties to retrieve the registered verified claim 196 to authenticate the user in the future.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103 or network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
  receiving an authentication request from an application, the request comprising a device fingerprint;

determining an identity key associated with the device fingerprint, the identity key indicating the location of an identity document associated with a signed claim identifying a user; and providing the identity key to the application.

2. The method of claim 1, further comprising:

presenting a prompt within a user interface, the prompt being configured to solicit the user for authentication credentials to an identity hub;

in response to receiving the authentication credentials through the prompt, sending a request to the identity hub for the identity key, the request comprising the authentication credentials for the identity hub; and receiving the identity key in response to sending the request to the identity hub.

3. The method of claim 1, wherein the device fingerprint comprises a browser fingerprint for a browser.

4. The method of claim 1, wherein the identity key is a first identity key, the signed claim is a first signed claim, and the method further comprises:

generating a second identity key and an asymmetric cryptographic key-pair associated with the identity key and the identity document; and sending a request for a second signed claim to the application, the request comprising an authentication credential for the application and the device fingerprint.

5. The method of claim 4, further comprising registering the second identity key and the identity document with a distributed ledger.

6. The method of 4, further comprising:

receiving the second signed claim; and storing the second identity key, the asymmetric cryptographic key-pair, and the second signed claim in an identity hub.

7. The method of claim 1, wherein the device fingerprint comprises a hardware identifier of a computing device.

8. A system, comprising:

a first computing device comprising a processor and a memory; and machine-readable instructions stored in the memory that, when executed by the processor, cause the computing device to at least:

receive, from an application executing on a second computing device, a fingerprint for the second computing device;

search a distributed ledger for an identity key associated with the fingerprint for the second computing device, the identity key being linked to a signed claim stored in the distributed ledger;

retrieve the signed claim from the distributed ledger;

evaluate the signed claim to determine that the fingerprint identifies an authorized user account; and grant the application executing on the second computing device access to a computing resource in response to evaluating the signed claim.

9. The system of claim 8, wherein the machine-readable instructions that cause the first computing device to obtain the identity key, when executed by the processor, further cause the first computing device to at least:

request the identity key from the application executing on the second computing device; and receive the identity key from the application executing on the second computing device.

10. The system of claim 8, wherein the signed claim is a first signed claim, the identity key is a first identity key, and the machine-readable instructions, when executed by the processor, further cause the first computing device to at least:

receive a first request for a second signed claim from the application executing on the second computing device;

send a second request to the application executing on the second computing device for a user identifier and an authentication credential;

receive the user identifier and the authentication credential from the application executing on the second computing device; and verify the authentication credential.

11. The system of claim 10, wherein the machine-readable instructions, when executed by the processor, further cause the first computing device to at least:

create a claim that asserts that the fingerprint identifies a client device controlled by the authorized user account;

sign the claim to create a second signed claim; and provide the second signed claim to the application executing on the second computing device.

12. The system of claim 8, wherein the machine-readable instructions that cause the first computing device to evaluate the signed claim, when executed by the processor, further cause the first computing device to at least:

determine an identity of a signing entity of the signed claim; and evaluate an authentication rule to determine that the identity of the signing entity is a trusted entity.

13. The system of claim 8, wherein the fingerprint is a hardware-based identifier associated with the computing device.

14. The system of claim 8, wherein the application is a browser and the fingerprint is a browser fingerprint.

15. A method, comprising:

receiving, with a first computing device, an identity key and a device fingerprint from an application executing on a second computing device in network communication with the first computing device;

sending, with the first computing device, a request for a user identifier and an authentication credential to the application;

receiving, with the first computing device, the user identifier and the authentication credential from the application;

verifying, with the first computing device, the authentication credential;

generating, with the first computing device, a claim that asserts that the identity key is associated with the device fingerprint; and providing, with the first computing device, the claim to the second computing device.

16. The method of claim 15, further comprising registering, with the first computing device, the claim with a distributed ledger to create a registered verified claim.

17. The method of claim 15, further comprising:

generating, with the first computing device, a signature of the claim; and storing, with the first computing device, the claim, the signature, and the identity key in the verified claim.

18. The method of claim 15, wherein receiving the identity key and the device fingerprint occurs in response to a previous determination that the identity key is associated with the device fingerprint.

19. The method of claim 15, wherein the device fingerprint is a hardware identifier associated with the second computing device.

20. The method of claim 15, wherein the application is a browser and the device fingerprint is a browser fingerprint for the second computing device.

\* \* \* \* \*